(12) United States Patent
Levatte et al.

(10) Patent No.: US 11,068,888 B1
(45) Date of Patent: Jul. 20, 2021

(54) VALUE-TRANSFER PAYMENT SYSTEM

(71) Applicant: Countia, LLC, Tampa, FL (US)

(72) Inventors: Ronell Levatte, Tampa, FL (US); Ryan Seay, Cambridge, MA (US); Shams Khan, Wesley Chapel, FL (US)

(73) Assignee: Countia, LLC., Tampa, FL (US)

( * ) Notice: Subject to any disclaimer, the term of this patent is extended or adjusted under 35 U.S.C. 154(b) by 0 days.

(21) Appl. No.: 16/268,655

(22) Filed: Feb. 6, 2019

(51) Int. Cl.
| | |
|---|---|
| *G06Q 20/38* | (2012.01) |
| *H04L 9/32* | (2006.01) |
| *G06Q 20/10* | (2012.01) |
| *G06Q 20/40* | (2012.01) |

(Continued)

(52) U.S. Cl.
CPC ....... *G06Q 20/389* (2013.01); *G06Q 20/1085* (2013.01); *G06Q 20/40145* (2013.01); *H04L 9/3231* (2013.01); *G06Q 20/0658* (2013.01); *G06Q 2220/00* (2013.01); *H04L 2209/38* (2013.01); *H04L 2209/56* (2013.01); *H04W 84/18* (2013.01)

(58) Field of Classification Search
CPC ............ G06Q 20/389; G06Q 20/1085; G06Q 20/40145; G06Q 20/0658; G06Q 2220/00; G06Q 20/38; G06Q 20/10; G06Q 20/40; G06Q 20/06; H04L 9/3231; H04L 2209/38; H04L 2209/56; H04L 9/32; H04W 84/18
See application file for complete search history.

(56) References Cited

U.S. PATENT DOCUMENTS

| | | | |
|---|---|---|---|
| 9,135,787 B1 * | 9/2015 | Russell | ................. G07F 19/201 |
| 9,406,063 B2 | 8/2016 | Zhou et al. | |
| 9,608,829 B2 | 3/2017 | Spanos et al. | |

(Continued)

FOREIGN PATENT DOCUMENTS

| | | |
|---|---|---|
| WO | 2016128569 A1 | 8/2016 |
| WO | 2017006134 A1 | 1/2017 |
| WO | 2017109140 A1 | 6/2017 |

OTHER PUBLICATIONS

Michelle Michalow, "Analayis of The Impact of Technological Advances on Financial Institutions," May 2016, Utica College, pp. 1-85. (Year: 2016).*

(Continued)

*Primary Examiner* — Kenneth Bartley
(74) *Attorney, Agent, or Firm* — Albert Bordas, P.A.

(57) ABSTRACT

A value-transfer payment system, having an electronic device, an operations center, a blockchain, a decentralized mesh networking, and an identification confidence-based system. The blockchain is associated to the decentralized mesh networking to define an immutable and decentralized platform that allows users to transfer funds. The electronic device is a computer device or a teller machine. The blockchain associated with the decentralized mesh networking is accessed via Internet with the computer device through a central website, mobile applications, or through third-party website/mobile applications or through the teller machine. The decentralized mesh networking has a plurality of nodes operatively associated to each other. The value-transfer payment system works in rural locations through the decentralized mesh networking, whereby the users are allowed for transfer the funds with or without the availability of traditional dial-up, broadband, or wireless Internet connectivity.

1 Claim, 3 Drawing Sheets

(51) Int. Cl.
*H04W 84/18* (2009.01)
*G06Q 20/06* (2012.01)

(56) References Cited

U.S. PATENT DOCUMENTS

| | | | | |
|---|---|---|---|---|
| 10,176,418 B1* | 1/2019 | Osborn | .............. | G06K 19/0723 |
| 10,282,650 B1* | 5/2019 | Osborn | .............. | G06K 19/071 |
| 10,332,205 B1* | 6/2019 | Russell | .............. | G06Q 40/04 |
| 10,433,115 B1* | 10/2019 | Levatte | .............. | H04W 4/029 |
| 10,438,104 B1* | 10/2019 | Osborn | .............. | G06K 19/071 |
| 2015/0088721 A1* | 3/2015 | Samid | .............. | G06Q 40/04 |
| | | | | 705/37 |
| 2015/0170112 A1* | 6/2015 | DeCastro | .............. | G06Q 20/381 |
| | | | | 705/39 |
| 2015/0324789 A1* | 11/2015 | Dvorak | .............. | H04W 12/06 |
| | | | | 705/67 |
| 2016/0012465 A1* | 1/2016 | Sharp | .............. | G06Q 20/10 |
| | | | | 705/14.17 |
| 2016/0028552 A1 | 1/2016 | Spanos et al. | | |
| 2016/0140653 A1* | 5/2016 | McKenzie | .............. | G06Q 20/3678 |
| | | | | 705/69 |
| 2016/0196553 A1* | 7/2016 | Barhydt | .............. | G06Q 20/3829 |
| | | | | 705/71 |
| 2016/0267472 A1* | 9/2016 | Lingham | .............. | G06Q 20/20 |
| 2016/0267605 A1* | 9/2016 | Lingham | .............. | G06Q 20/3433 |
| 2016/0335628 A1* | 11/2016 | Weigold | .............. | G06Q 20/3829 |
| 2016/0342989 A1* | 11/2016 | Davis | .............. | G06Q 20/385 |
| 2017/0017936 A1* | 1/2017 | Bisikalo | .............. | G06Q 20/065 |
| 2017/0053249 A1* | 2/2017 | Tunnell | .............. | G06Q 20/065 |
| 2017/0243208 A1* | 8/2017 | Kurian | .............. | G06Q 20/40 |
| 2017/0244707 A1* | 8/2017 | Johnsrud | .............. | G06Q 20/389 |
| 2018/0204111 A1* | 7/2018 | Zadeh | .............. | G06K 9/00281 |
| 2018/0240086 A1* | 8/2018 | Sobotka | .............. | G06Q 20/065 |
| 2018/0268382 A1* | 9/2018 | Wasserman | .............. | G06Q 20/0655 |
| 2018/0293573 A1* | 10/2018 | Ortiz | .............. | G06Q 20/023 |
| 2019/0081796 A1* | 3/2019 | Chow | .............. | H04L 9/30 |
| 2019/0130387 A1* | 5/2019 | Arora | .............. | G06Q 30/0207 |
| 2019/0164156 A1* | 5/2019 | Lindemann | .............. | H04L 9/3239 |
| 2019/0165949 A1* | 5/2019 | Ramos | .............. | G06F 21/645 |
| 2019/0213584 A1* | 7/2019 | Shanmugam | .............. | G06Q 20/381 |
| 2019/0236564 A1* | 8/2019 | Cantrell | .............. | G06Q 20/0658 |
| 2019/0311336 A1* | 10/2019 | Kim | .............. | G06Q 20/36 |
| 2019/0333057 A1* | 10/2019 | Miller | .............. | G06Q 20/351 |
| 2019/0347651 A1* | 11/2019 | Moreno | .............. | G06Q 20/385 |
| 2019/0356641 A1* | 11/2019 | Isaacson | .............. | G06Q 20/40 |
| 2020/0005295 A1* | 1/2020 | Murphy | .............. | G06Q 20/204 |
| 2020/0034869 A1* | 1/2020 | Harrison | .............. | G06Q 30/0233 |
| 2020/0111092 A1* | 4/2020 | Wood | .............. | G06F 9/44 |
| 2020/0118204 A1* | 4/2020 | Chakraborty | .............. | H04L 9/0637 |
| 2020/0134618 A1* | 4/2020 | Morgan | .............. | G06Q 20/3221 |
| 2020/0184435 A1* | 6/2020 | Castinado | .............. | G06F 21/31 |

OTHER PUBLICATIONS

Social Engineering Through Inadequate System Design and Human Dissemination (pp. 71-74) by Ryan Seay—published Apr. 2016 through American Public University.

* cited by examiner

VALUE-TRANSFER PAYMENT SYSTEM

BACKGROUND OF THE INVENTION

1. Field of the Invention

The present invention relates to value-transfer payment systems, and more particularly, to value-transfer payment systems having a blockchain and a decentralized mesh networking.

2. Description of the Related Art

Non-patent literature: *Social Engineering Through Inadequate System Design and Human Dissemination* (pages 71-74) by Ryan Seay—published April 2016 through American Public University.

Applicant believes that one of the closest references corresponds to U.S. Pat. No. 9,608,829 issued to Spanos, et al., on Mar. 28, 2017 for System and method for creating a multi-branched blockchain with configurable protocol rules. However, it differs from the present invention because Spanos, et al. teach a blockchain called a slidechain that allows for multiple valid branches or forks to propagate simultaneously with a customized set of protocol rules embedded in and applied to each fork chain that branches from another chain. A computer-implemented method for accessing, developing and maintaining a decentralized database through a peer-to-peer network, to preserve the original state of data inputs while adapting to changing circumstances, user preferences, and emerging technological capabilities.

Applicant believes that another reference corresponds to U.S. Pat. No. 9,406,063 issued to Zhou, et al. on Aug. 2, 2016 for Systems and methods for messaging, calling, digital multimedia capture, payment transactions, global digital ledger, and national currency world digital token. However, it differs from the present invention because Zhou, et al. teach a computer implemented methods and systems for using a global world universal digital mobile and wearable currency. The method commences with receiving a transfer request. The transfer request is associated with an amount represented in tokens of the global world universal digital mobile and wearable currency. The transfer request includes at least a sender account, a recipient account, and the amount. The method continues with transferring the amount from the sender account to the recipient account based on the transfer request.

Applicant believes that another reference corresponds to U.S. Patent Application Publication No. 2016/0028552, published on Jan. 28, 2016 to Spanos, et al. for System and method for creating a multi-branched blockchain with configurable protocol rules. However, it differs from the present invention because Spanos, et. al. teach a creating a blockchain called a slidechain that allows for multiple valid branches or forks to propagate simultaneously with a customized set of protocol rules embedded in and applied to each fork chain that branches from another chain. A computer-implemented method for accessing, developing and maintaining a decentralized database through a peer-to-peer network, to preserve the original state of data inputs while adapting to changing circumstances, user preferences, and emerging technological capabilities.

Applicant believes that another reference corresponds to International Publication No. WO2017109140 published on Jun. 29, 2017 to Trent Lorne McConaghy, et al. for Decentralized, tamper-resistant, asset-oriented database system and method of recording a transaction. However, it differs from the present invention because Trent Lorne McConaghy, et al. teach a blockchain database, which combines the benefits of traditional distributed databases with new benefits from blockchain technology. It builds on a traditional distributed database that has scalable read/write throughput, scalable capacity, a query language, efficient querying, and permissioning. It adds in new "blockchain" benefits of decentralized shared control, tamper-resistance, and creation and movement of digital assets.

Applicant believes that another reference corresponds to International Publication No. WO2016128569, published on Aug. 18, 2016 to Garcia, et al. for Digital identity system. However, it differs from the present invention because Garcia, et al. teach a method of a digital identity system generating a sharing token for authenticating a bearer to a validator, wherein a data store of the digital identity system holds a plurality of attributes of the bearer, the method comprising implementing by the digital identity system the following steps: receiving at the digital identity system from a bearer an electronic sharing token request, wherein the token request identifies at least one of the bearer's attributes in the data store selected for sharing with a validator; in response to the electronic token request, generating a sharing token, which is unique to that request, for presentation by the bearer to a validator; associating with the unique sharing token at the digital identity system the identified at least one bearer attribute; and issuing to the bearer the unique sharing token; and wherein later presentation of the unique sharing token to the digital identify system by a validator causes the at least one bearer attribute associated with the sharing token to be rendered available to the validator by the digital identity system.

Applicant believes that another reference corresponds to International Publication No. WO2017006134, published on Jan. 12, 2017 to Wilson, et al. for Secure digital data operations. However, it differs from the present invention because Wilson, et al. teach a method and system for transferring digital currency from a payer to recipient comprising receiving an identifier of data describing the first entity. Retrieving an entry from a block chain based on the received identifier. Authenticating the entry using a public key of the second entity. Extracting the data describing the first entity from the retrieved entry. Authenticating a block in the block chain containing the entry using a public key of a third entity. If the authentication of the block in the block chain is successful, then transferring digital currency from a payer to a recipient, wherein the first entity is the payer or the recipient, and wherein transferring digital currency from the payer to the recipient comprises the payer. Obtaining wallet public key data associated with the recipient. Generating, using at least the wallet public key data, a currency public key for the amount of digital currency to be transferred to the recipient. Generating transfer data comprising at least the currency public key data and a value for the amount of digital currency to be transferred to the fourth entity.

Other patents describing the closest subject matter provide for a number of more or less complicated features that fail to solve the problem in an efficient and economical way. None of these patents suggest the novel features of the present invention.

SUMMARY OF THE INVENTION

The instant invention is a value-transfer payment system, comprising an electronic device operatively associated with a first non-transitory computer readable medium, an operations center, a blockchain implemented through application programming interfaces and software development kits, a decentralized mesh networking, and an identification confidence-based system. The operations center comprises at least one computer having software, and servers and databases operatively associated with a second non-transitory computer readable medium.

The identification confidence-based system runs on the software to enable the user to pass a verification and authentication process. The identification confidence-based system comprises at least one element forming an algorithm. The blockchain is associated to the decentralized mesh networking to define an immutable and decentralized platform that allows users to transfer funds.

The electronic device is a computer device or a teller machine. The computer device comprises electronic devices, smart phones, tablets, smart watches, and computers including supercomputers, mainframe computers, minicomputers, and/or microcomputers.

The blockchain associated with the decentralized mesh networking is accessed via internet with the computer device through a central website, mobile applications, or through third-party website/mobile applications, or through the teller machine. The blockchain associated to the decentralized mesh networking is accessed through the computer device or the teller machine to deposit, withdraw, transfer, or exchange the funds. The funds are fiat currency and digital currency/crypto-assets.

The funds are exchanged and deposited through physical crypto-asset cards. The physical crypto-asset cards are equivalent in value to the digital currency/crypto assets.

The decentralized mesh networking comprises a plurality of nodes operatively associated to each other. The teller machine and the nodes act as components of the decentralized mesh networking.

The value-transfer payment system of present invention, works in rural locations through the decentralized mesh networking, whereby the users are allowed for transfer the funds with or without the availability of traditional dial-up, broadband, or wireless internet connectivity for the computer devices by means of short-range and long-range wireless communication. The blockchain allows for deposit, conversion, transfer, or withdraw of a multitude of blockchain-based assets across various platforms and other different blockchain.

The at least one element forming an algorithm includes a user agent that defines user software, or a software agent expected on the computer device. The at least one element forming an algorithm also includes content language, a list of plugins, and a platform expected on the computer device.

The at least one element forming an algorithm also includes a time zone that the computer device is recognized to be in, a screen resolution, and a font list expected on the computer device.

The at least one element forming an algorithm can be combined with the user typing speed and gamification elements to further increase a likelihood of the user positive identification. The at least one element forming an algorithm can be also combined with a manner the user arrives on a page, key-press and mouse click events that occur before login attempt(s), speed and accuracy of a credential entry, geolocation, IP address, and proxy usage to build a confidence profile of a the user.

The at least one element forming an algorithm is captured through canvas fingerprinting and used as part of an authentication process. The identification confidence-based system compares a signal representing at least one physical or biometric characteristic of the user with stored user authentication information in the at least one computer.

It is therefore one of the main objects of the present invention to provide a value-transfer payment system.

It is another object of this invention to provide a value-transfer payment system that is resolved, stored, and consensed through a decentralized blockchain network.

It is another object of this invention to provide a value-transfer payment system that allows for the storage, transmission, and reception of values through electronic devices.

It is another object of this invention to provide a value-transfer payment system that has an immutable blockchain system.

It is another object of this invention to provide a value-transfer payment system that has a blockchain associated to a decentralized mesh networking to define an immutable and decentralized platform that allows users to transfer funds.

It is another object of this invention to provide a value-transfer payment system in which a decentralized mesh networking allows for data transfer with or without the availability of traditional dial-up, broadband, or wireless Internet connectivity.

It is another object of this invention to provide a value-transfer payment system in which the ability for hackers or malcontents to alter the contents decrease, and also offering an exponential redundancy that reduces data loss potential to near nullity.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
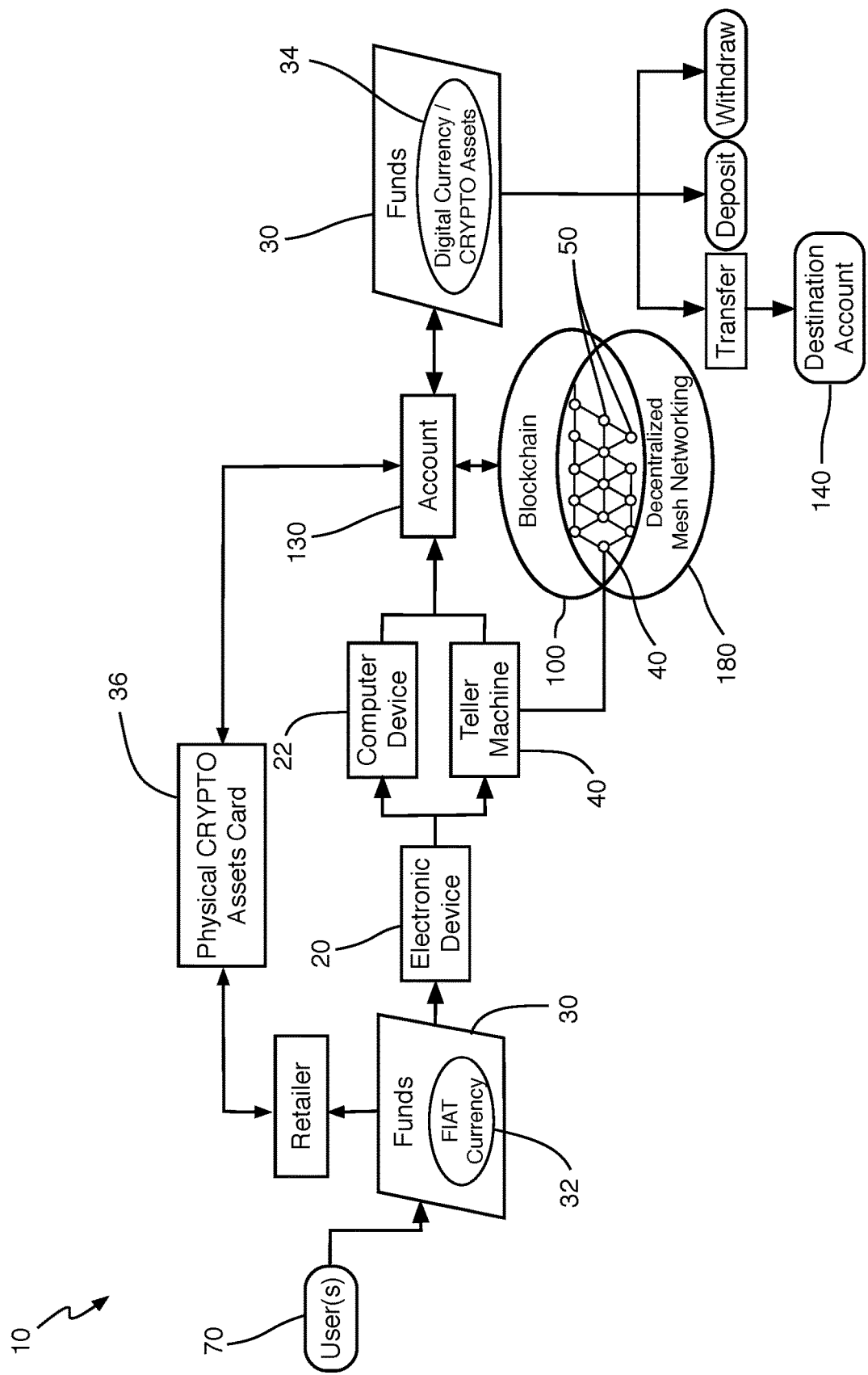
FIG. 1 is a diagram of the present invention.

Referring now to the drawings, the present invention is generally referred to with numeral 10. It can be observed that it basically includes electronic device 20, operations center 80, blockchain 100, decentralized mesh networking 180, and identification confidence-based system 200.

Figure 2:
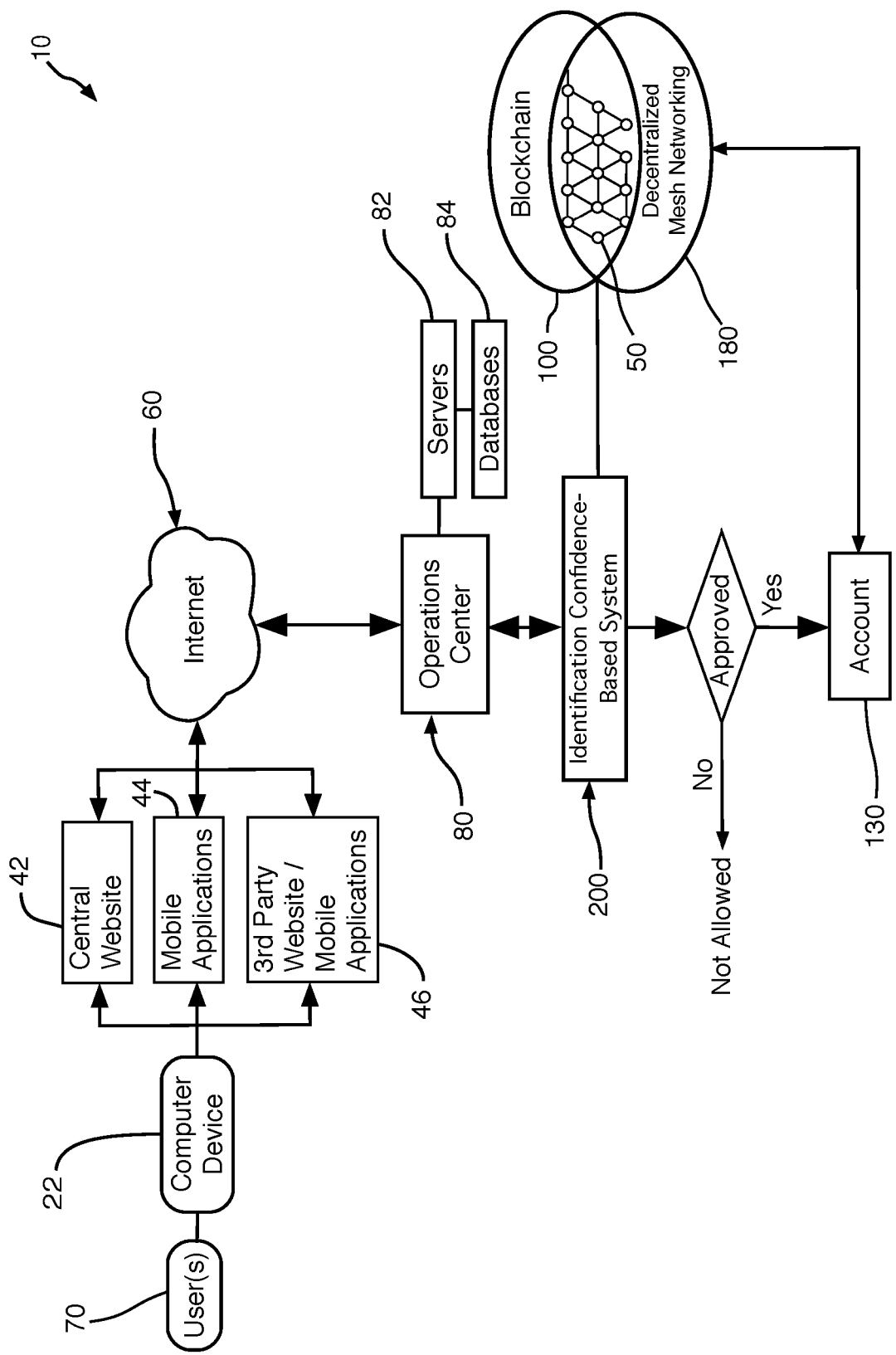
FIG. 2 is a diagram of the present invention using a computer device.

As seen in FIGS. 1 and 2, present invention 10 allows users 70 to participate in a value-transfer system, which is resolved, stored, and consensed through blockchain 100, which is a decentralized blockchain network. Present invention 10 allows the storage, transmission, and reception of value through electronic device 20. Electronic device 20 may be computer device 22 or teller machine 40. In a preferred embodiment, computer device 22 is an electronic device, smart phone, tablet, smart watch, or computer, including but not limited to, supercomputers, mainframe computers, minicomputers, and/or microcomputers.

Electronic device 20 is operatively associated with a first non-transitory computer readable medium. Operations center 80 comprises at least one computer having software, and servers and databases operatively associated with a second non-transitory computer readable medium.

The infrastructure of blockchain 100 is an integral element to present invention 10. Blockchain 100 is an immutable blockchain system. This immutable, distributed, and decentralized platform of blockchain 100 decreases the ability for hackers or malcontents to alter contents while also offering an exponential redundancy that reduces data loss potential to near nullity. When coupled with encryption, it also provides an auditable platform that allows users 70, or organizations, to store, transfer, and receive funds 30.

Blockchain 100 is implemented through application programming interfaces and software development kits. Blockchain 100 is associated to decentralized mesh networking 180 to define an immutable and decentralized platform that allows users 70 to transfer funds 30. Funds 30 are fiat currency 32 or crypto-assets/digital currency 34.

As seen in FIG. 1, blockchain 100 associated to decentralized mesh networking 180 may be accessed through computer device 22 or teller machine 40.

In a preferred embodiment, blockchain 100 is associated to decentralized mesh networking 180, whereby teller machines 40 and nodes 50 serve as decentralized components of an infrastructure of blockchain system 100. Nodes 50 participate in the consensus aspect, and teller machines 40 offer additional functionality to network. Teller machines 40 are physically placed in multiple geo-locational points across a service area and allow users 70 to deposit, withdraw, and transfer funds 30. Teller machines 40 may also act as nodes 50 for the sake of the consensus process.

Users 70 are able to approach teller machines 40 with fiat currency 32 with the intent to deposit it into respective account 130. Fiat currency 32 may be any currency of any country, for example a US dollar. Users 70 need to pass a verification and authentication process. Users 70 may insert desired funds 30 into a feeding-slot, not seen, of teller machine 40 to pass a verification and authentication process. Teller machine 40 counts and verifies an amount of funds 30. Once confirmed, the amount will be exchanged into the blockchain's native currency based on a conversion rate respective to the inserted currency and the amount will be stored within respective account 130. Users 70 can choose between ending the session, withdrawing funds, or sending funds to another user 70 using present invention 10. Users 70 utilizing present invention 10 do not need to be within a same country/nation having boundaries, nor store/receive funds 30 in a same currency.

Referring to FIGS. 1 and 2 again, while present invention 10 uses a proprietary blockchain 100 crypto-asset natively, present invention 10 allows for the deposit, conversion, transfer, and withdraw of a multitude of blockchain-based assets across various platforms and blockchain 100. For example, user 70 may deposit Bitcoin, despite it existing on a different blockchain 100, and see those funds 30 exchanged/stored in the native crypto-asset of the system's blockchain. User 70, when transferring and withdrawing, may choose to send funds 30 in the form of XRP tokens, despite existing on a different blockchain. The value intelligently sorts and exchanges between respective crypto-assets for all incoming and outgoing transactions. It is noted that this is just one example of how a theoretical deposit and withdraw may occur utilizing present invention 10, whereby a transaction deposit occurs with Bitcoin (BTC) and ends with a withdraw of Ripple's XRP token. This serves as a cohesive example from start to finish, whereby the withdraw occurring in XRP is just one example of many different tokens/currencies that may serve as the endpoint for a transaction.

As a means of increasing platform accessibility primarily in underdeveloped and rural areas, present invention 10 allows for funds 30 to be exchanged/deposited into a platform through physical crypto-asset cards 36. Physical crypto-asset cards 36 are available through tradition brick-and-mortar outlets such as retailers 300. Other examples of retailers 300, include but are not limited to, gas/petrol stations, convenience stores, and grocery stores. Before purchase, physical crypto-asset cards 36 exist as unvalued plastic cards that are merely linked to an unused blockchain address within the platform. Once purchased, physical crypto-asset cards 36 can be activated and funds 30 can be loaded through a system available at a place of purchase according to present invention 10. User 70 may load funds 30 to physical crypto-asset cards 36 by exchanging fiat currency 32 for digital currency/crypto-assets 34, which will be stored in account 130. Retailer 300 selling this service accepts funds 30 and transfers the respective digital currency/crypto-assets 34 to destination account 140.

Once account 130 has been activated and funds 30 have been loaded, physical crypto-asset cards 36 are equivalent to digital currency/crypto-assets 34 for the purpose of value in present invention 10. To utilize or spend funds 30, the balance needs to be imported or attached to an authenticated account 130 within the platform. User 70 who has activated and loaded funds 30 needs only import a private key of physical crypto-asset cards 36 into account 130 to load the balance into the available funds 30. Each physical crypto-asset card 36 has respective account 130 and a private key attached to it with both pieces being important authentication, authorization, and security elements of the platform.

Present invention 10 comprises decentralized mesh networking 180. While the immutable and decentralized manner of network of blockchain 100 handles concerns of data reliability, and auditability, the need for greater availability than competing systems is solved by decentralized mesh networking 180. Teller machines 40 and nodes 50 act as components of decentralized mesh networking 180. It is noted that nodes 50 is a plurality of nodes.

Users 70 of decentralized mesh networking 180 are allowed for data transfer with or without the availability of traditional dial-up, broadband, or wireless Internet connectivity for devices within the range of any user 70 by means of short-range and long-range wireless communication.

As seen in FIG. 2, for nodes 50 residing within businesses and residences, the participant nodes 50 share traditional broadband Internet 60 to the network through short range wireless communication. For enterprise nodes 50 placed on top of buildings or antennae, broadband and non-internet-based communications will be shared through long range wireless communications, in these instances, long range wireless technology can transmit information between nodes 50 miles apart from each other as an example.

Present invention 10 further allows for a prioritization of users 70 that allows smart phones and cellular networks to act as participants.

Blockchain 100 associated to decentralized mesh networking 180 may also be accessed via internet 60 with computer device 22 through central website 42, mobile applications 44, or through third-party website/mobile applications 46 as implemented through APIs and SDKs. Specifically, user 70 may carry-out similar actions through central website 42, mobile application 44, and third-party web site/mobile application 46, but by these means it is not possible to deposit and withdraw tangible fiat currency 32, seen in FIG. 1. However, users 70 are able to deposit and withdraw digital currency/crypto-assets 34, deposit fiat currency 32 stored in traditional digital constructs (online banking through ACH, SWIFT, IBAN, etc.) and send/receive funds 30 within the network as seen in FIG. 1.

Figure 3:
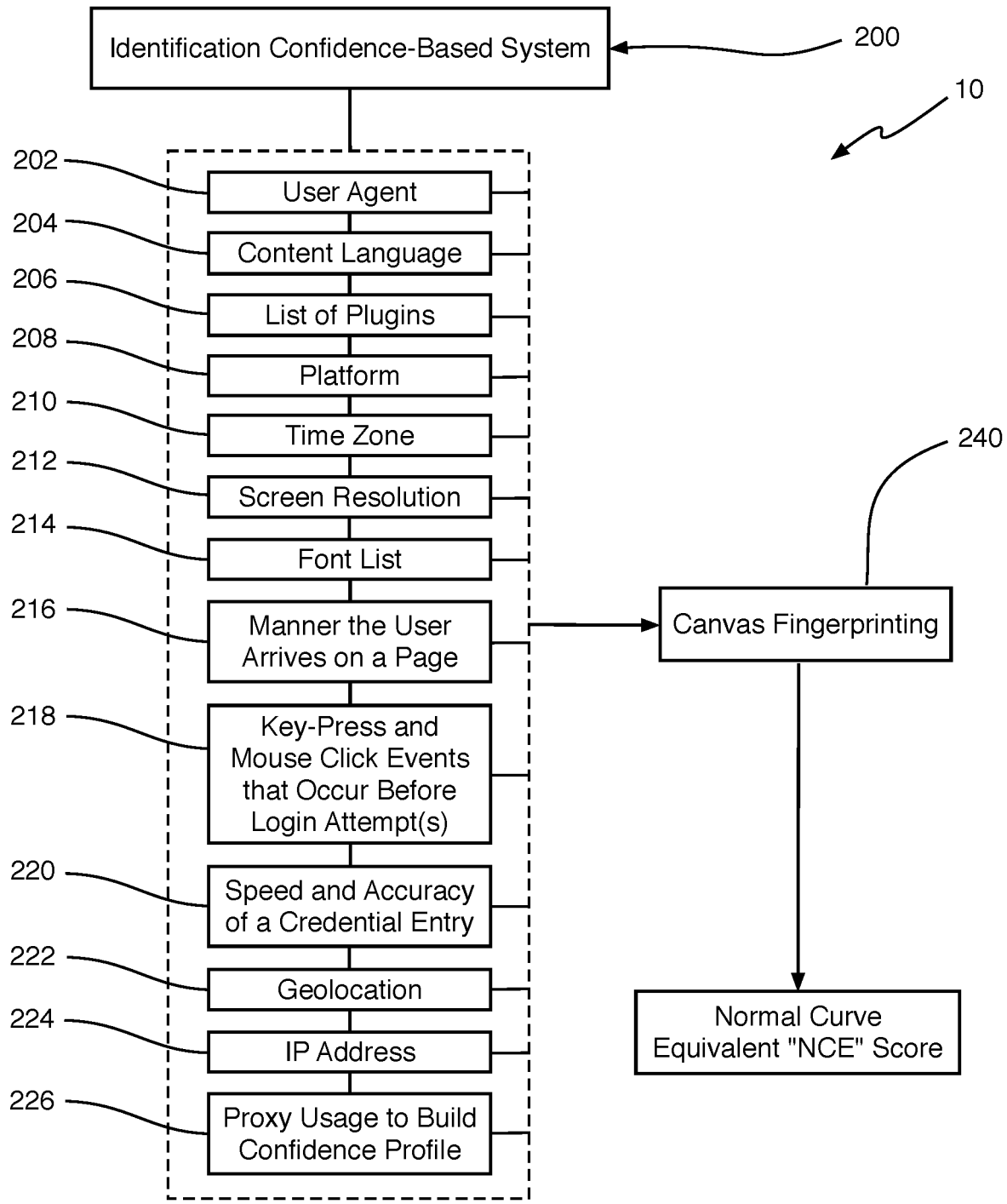
FIG. 3 is a diagram of identification confidence-based system.

As seen in FIGS. 2 and 3, present invention 10 further comprises identification confidence-based system 200. Identification confidence-based system 200 requires that users 70 pass the verification and authentication process.

Identification confidence-based system 200 seeks to implement an authentication with the introduction of a normal curve equivalent "NCE" score that is utilized in different aspects of present invention 10. As an example, identification confidence-based system 200 comprises a numerical confidence level defined between two variables; as an example 0-100, to define how confident present invention 10 is of a user's identification.

As seen in FIG. 3, identification confidence-based system comprises the following elements forming an algorithm:

User agent 202 defines user software, or a software agent, that is acting on behalf of a user expected on a computer. In one example, user agent 202 comprises Mozilla/5.0 (X11; Ubuntu; Linux x86_64; rv:57.0) Gecko/20100101 Firefox/57.0.

Content language 204 defines specific content languages expected on computer device 22 of users 70. In one example, content language 204 comprises en-US,en; q=0.5 (English).

List of plugins 206 defines a specific list of plugins expected on computer device 22 of users 70. In one example, list of plugins 206 comprises "Shockwave Flash", "libflashplayer.so", "Chrome PDF Viewer", and "Widevine Content Decryption Module.

Platform 208 defines a specific platform that users 70 use, or otherwise is recognized to be on. In one example, platform 208 is an "Linux x86_64".

Time zone 210 defines a specific region of the globe that users reside, or otherwise is recognized to be in. In one example, time zone 210 is UTC-5.

Screen resolution 212 defines a display resolution with specific parameters expected on a computer monitor of users 70. In one example, screen resolution 212 is 2560×1080×24.

Font list 214 defines fonts with specific parameters expected on computer device 22 of users 70. In one example, font list 214 comprises Andale Mono, Arial, Arial Black, Comic Sans MS, Courier, Courier New, Georgia, Helvetica, Impact, Times, Times New Roman, Trebuchet MS, Ubuntu, and Verdana.

User agent 202, content language 204, list of plugins 206, platform 208, time zone 210, screen resolution 212, and font list 214 can be combined with others such as user typing speed and gamification elements to further increase the likelihood of user 70 positive identification. Furthermore, these considerations can be combined with other obtainable information such as manner of user 70 arrives on a page 216, key-press and mouse click events that occur before login attempt(s) 218, speed and accuracy of a credential entry 220, geolocation 222, IP address 224, and proxy usage to build confidence profile 226 of prospective users 70.

User agent 202, content language 204, list of plugins 206, platform 208, time zone 210, screen resolution 212, font list 214, manner the users 70 arrives on a page 216, key-press and mouse click events that occur before login attempt(s) 218, speed and accuracy of a credential entry 220, geolocation 222, IP address 224, and proxy usage to build confidence profile 226 is captured through canvas fingerprinting 240 and used as part of the authentification process.

In a preferred embodiment, canvas fingerprinting 240 may be HTML5 canvas fingerprinting that is used as part of the authentication process. HTML5 is a markup language used for structuring and presenting content on Internet 60. HTML5 is intended to subsume not only HTML4, but also XHTML1 and DOM Level 2 HTML. HTML5 includes detailed processing models to encourage interoperable implementations. It extends, improves and rationalizes the markup available for documents, and introduces markup and the APIs for complex web applications. HTML5 is also a candidate for cross-platform mobile applications. The APIs and Document Object Model (DOM) are now fundamental parts of the HTML5 specification and HTML5 also better defines the processing for any invalid documents.

In operation, the concept of canvas fingerprinting 240 is to use uniquely identifiable information from a specified personal software and hardware of computer device 20 to identify a potential system and users 70 without he or she logging into an account or accessing a stored cookie. Canvas fingerprinting 240 is extremely effective as attempts to hide identity actually increase the chances of identification as anonymity techniques used in these processes make a user's system more unique.

As an example, user 70 may use a virtual private network "VPN" to make an IP address appear to resolve to the Ukraine. It theoretically should make it difficult to identify this user 70 as a particular individual. But, if user 70 from Ukraine running "Linux Ubuntu 64", at a resolution of 2560×1080, with an Impact font installed, an "Nvidia" graphics card, US English language designation, and two uniquely identifiable audio and graphical samplings appears, then it's more than likely operations center 80 can surmise that this may be the particular individual as he/she's been known to utilize VPNs from this same service and his system information is uniquely similar to other known instances.

Furthermore, designed elements of gamification, writing analysis, and audio/video interaction may be utilized as auxiliary elements to identification confidence-based system 200.

Therefore, when user 70 accesses present invention 10, identification confidence-based system 200 compares a signal representing at least one physical or biometric characteristic of user with stored user 70 authentication information in the computers comprising servers 82 and databases 84 operatively associated with a non-transitory computer readable medium.

Identification confidence-based system 200 provides that access to operations center 80 will be limited if the geographic location of computer device 22 is different to a geographical location registered for that specific user 70. Identification confidence-based system 200 also provides that access of user 70 to operations center 80 will be limited if computer device 22 has never been used before.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A value-transfer payment system, comprising:
   A) a computer device or a teller machine operatively associated with a first non-transitory computer readable medium, said computer device is a smart phone, tablet, smart watch, computer, supercomputers, mainframe computers, minicomputers, and/or microcomputers;

B) an operations center comprising at least one computer having software, and servers and databases operatively associated with a second non-transitory computer readable medium;

C) a blockchain implemented with at least one computer and processor;

D) a decentralized mesh networking, said blockchain is associated to said decentralized mesh networking to define a platform that allows users for connection of devices to transfer funds that are fiat currency and digital currency/crypto-assets, said decentralized mesh networking comprises a plurality of nodes operatively associated to each other, and said nodes act as components of said decentralized mesh networking; and E) an identification confidence-based system to enable said users to pass a verification and authentication process, said identification confidence-based system comprises an algorithm including at least one element, said at least one element includes a user agent that defines user software, or a software agent on said computer device, and said identification confidence-based system provides that access to said operations center will depend if a first geographic location of said computer device is different to a second geographical location registered for a specific said user, whereby there is a structural cooperative relationship between said computer device or a teller machine and said operations center for said users to transfer said funds, and said operations center to communicate information with said identification confidence-based system;

said blockchain associated with said decentralized mesh networking is accessed via Internet with said computer device through a central website, mobile applications, or through third-party website/mobile applications, or is accessed through said teller machine, said blockchain associated to said decentralized mesh networking is accessed through said computer device or said teller machine to deposit, withdraw, transfer, or exchange said funds, said funds are exchanged and deposited through physical crypto-asset cards that are equivalent in value to said digital currency/crypto assets, whereby funds are exchanged/deposited into said platform through said physical crypto-asset cards available through brick-and-mortar outlets, before purchase, said physical crypto-asset cards exist as unvalued plastic cards that are linked to an unused blockchain address within said platform, once purchased, said physical crypto-asset cards are activated and funds are loaded at a place of purchase, said users load said funds to said physical crypto-asset cards by exchanging said fiat currency for said digital currency/crypto-assets, which will be stored in an account, a retailer accepts said funds and transfers respective said digital currency/crypto-assets to a destination account, once said account has been activated and said funds have been loaded, said physical crypto-asset cards are equivalent to said digital currency/crypto-assets, and to utilize or spend said funds, a balance is imported or attached to an authenticated account within said platform and said users who have activated and loaded said funds need only import a private key of said physical crypto-asset cards into said account to load funds that result in a balance, whereby each said physical crypto-asset card has a respective said account and a private key attached to it with both pieces being authentication, authorization, and security elements of said platform, said funds transfer is made by short-range and long-range wireless communication, said blockchain allows for deposit, conversion, transfer, or withdraw of a multitude of blockchain-based assets across various platforms and other different blockchains, said at least one element includes content language, a list of plugins, and a platform on said computer device, said at least one element includes a time zone that said computer device is recognized to be in, said at least one element includes a screen resolution expected on said computer device, that said at least one element includes a font list expected on said computer device, said at least one element can be combined with said user typing speed and gamification elements to further increase a likelihood of said user positive identification, said at least one element can be combined with a manner said user arrives on a page, key-press and mouse click events that occur before login attempt(s), speed and accuracy of a credential entry, geolocation, Internet Protocol (IP) address, and proxy usage to build a confidence profile of said user, said at least one element is captured through canvas fingerprinting and used as part of an authentication process, and said identification confidence-based system compares a signal representing at least one physical or biometric characteristic of said user with stored user authentication information in said at least one computer.

* * * * *